United States Patent
Bach

(10) Patent No.: US 9,509,715 B2
(45) Date of Patent: Nov. 29, 2016

(54) PHISHING AND THREAT DETECTION AND PREVENTION

(71) Applicant: salesforce.com, inc., San Francisco, CA (US)

(72) Inventor: Timothy Bach, Emeryville, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 10 days.

(21) Appl. No.: 14/625,431

(22) Filed: Feb. 18, 2015

(65) Prior Publication Data

US 2016/0057167 A1 Feb. 25, 2016

Related U.S. Application Data

(60) Provisional application No. 62/040,322, filed on Aug. 21, 2014.

(51) Int. Cl.
*H04L 29/06* (2006.01)

(52) U.S. Cl.
CPC ............... *H04L 63/1483* (2013.01)

(58) Field of Classification Search
CPC ................................. H04L 63/1483
USPC ........................................... 726/23
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |

(Continued)

*Primary Examiner* — Longbit Chai
(74) *Attorney, Agent, or Firm* — Schwabe Williamson & Wyatt

(57) ABSTRACT

A threat detection system receives links from emails opened in web browsers. The received links are compared with a whitelist of trusted links and blacklisted links associated with security threats. The threat detection system sends trusted identifiers when the received links are identified in the whitelist and sends block identifiers back to the web browsers when the received links are identified in the blacklist. The trusted identifiers cause the web browsers to display a trusted message and the block identifiers cause the web browsers to remove the received link and display a warning message. The threat detection system may receive threat reports for suspected links from employees of a same enterprise and allow an enterprise security administrator to asynchronously update the blacklists and whitelists based on the threat reports received from the enterprise users.

22 Claims, 9 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,544,086 B2 * | 9/2013 | Field ................. G06F 21/56 713/164 |
| 8,554,847 B2 * | 10/2013 | Shue .................. G06F 15/16 709/206 |
| 8,566,301 B2 | 10/2013 | Rueben et al. |
| 8,646,103 B2 | 2/2014 | Jakobson et al. |
| 8,839,401 B2 * | 9/2014 | Starink ............ H04L 63/0281 726/11 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |

(56) References Cited

U.S. PATENT DOCUMENTS

| | | |
|---|---|---|
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |

\* cited by examiner

PHISHING AND THREAT DETECTION AND PREVENTION

CLAIM OF PRIORITY

This application claims the benefit of U.S. Provisional Patent Application 62/040,322 entitled, AUTOMATED PHISHING DETECTION AND PREVENTION by Timothy Bach, filed Aug. 21, 2014, the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to electronic communication threat detection and prevention and more specifically to detecting and preventing phishing attacks.

BACKGROUND

Phishing is the attempt to acquire sensitive information such as usernames, passwords, and/or credit card details by masquerading as a trustworthy entity in an electronic communication. Communications purporting to be from popular social websites, auction websites, banks, online payment processors, or information technology administrators are commonly used to lure the unsuspecting public.

Phishing emails may contain links to websites that are infected with malware. Phishing is typically carried out by email spoofing or instant messaging, and often directs users to enter details at a fake website whose appearance is almost identical to the corresponding legitimate website. Most methods of phishing use some form of technical deception designed to make a link, or uniform resource locator, in an email (and the spoofed website it leads to) appear to belong to the spoofed organization. One strategy for combating phishing is to educate people how to recognize phishing attempts, and how to deal with these attempts. Another popular approach to fighting phishing is to maintain a list of known phishing links and websites and to check links and websites against the list. Specialized spam filters can reduce the number of phishing emails that reach addressee inboxes.

A computer security incident response team may spread knowledge of targeted attacks via emails, text messages, and a computer security incident response team website. Anti-phishing software consists of computer programs that attempt to identify phishing content contained in websites and e-mail. Anti-phishing software may display the real domain name for the website the viewer is visiting, in an attempt to prevent fraudulent websites from masquerading as other legitimate web sites. However, users tend not to check security information, even when it is explicitly displayed to them.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
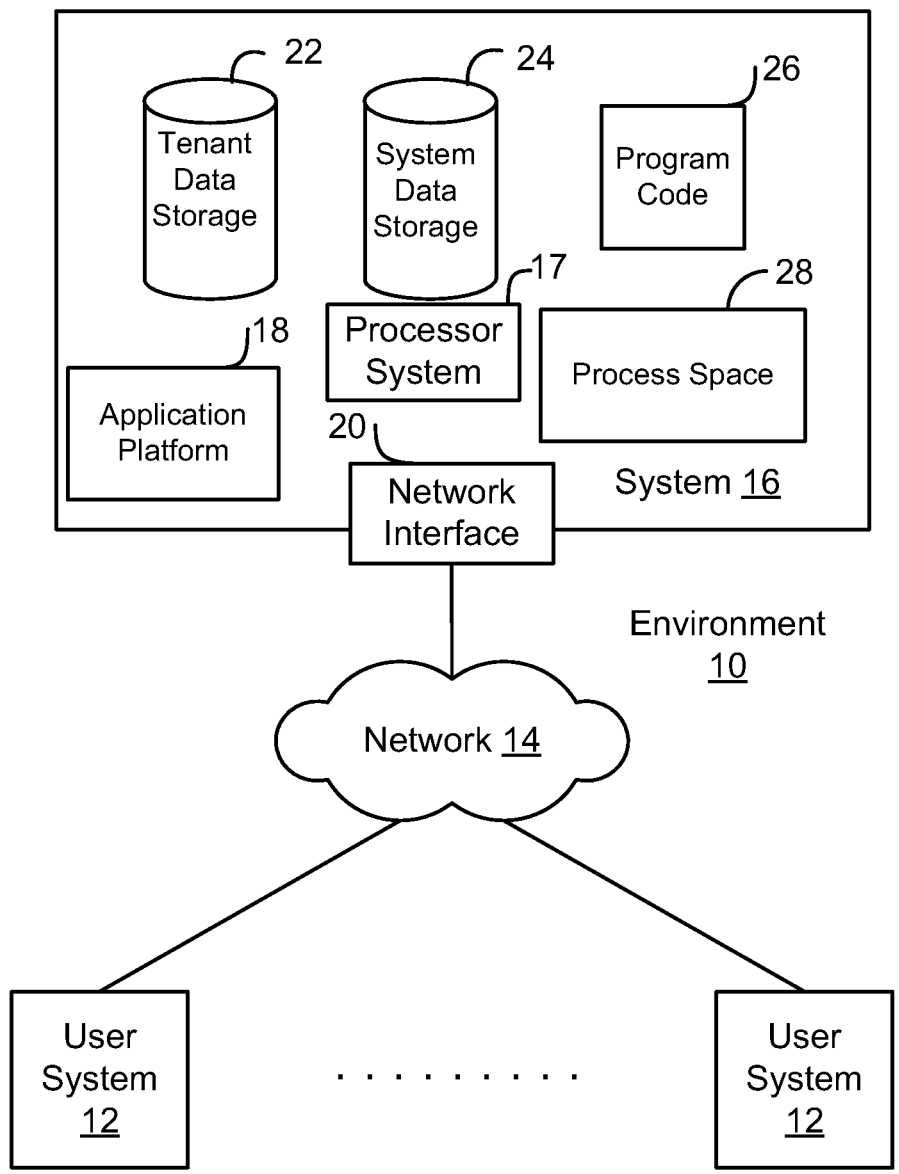
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud.

The disclosed implementations may be described with reference to an email Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
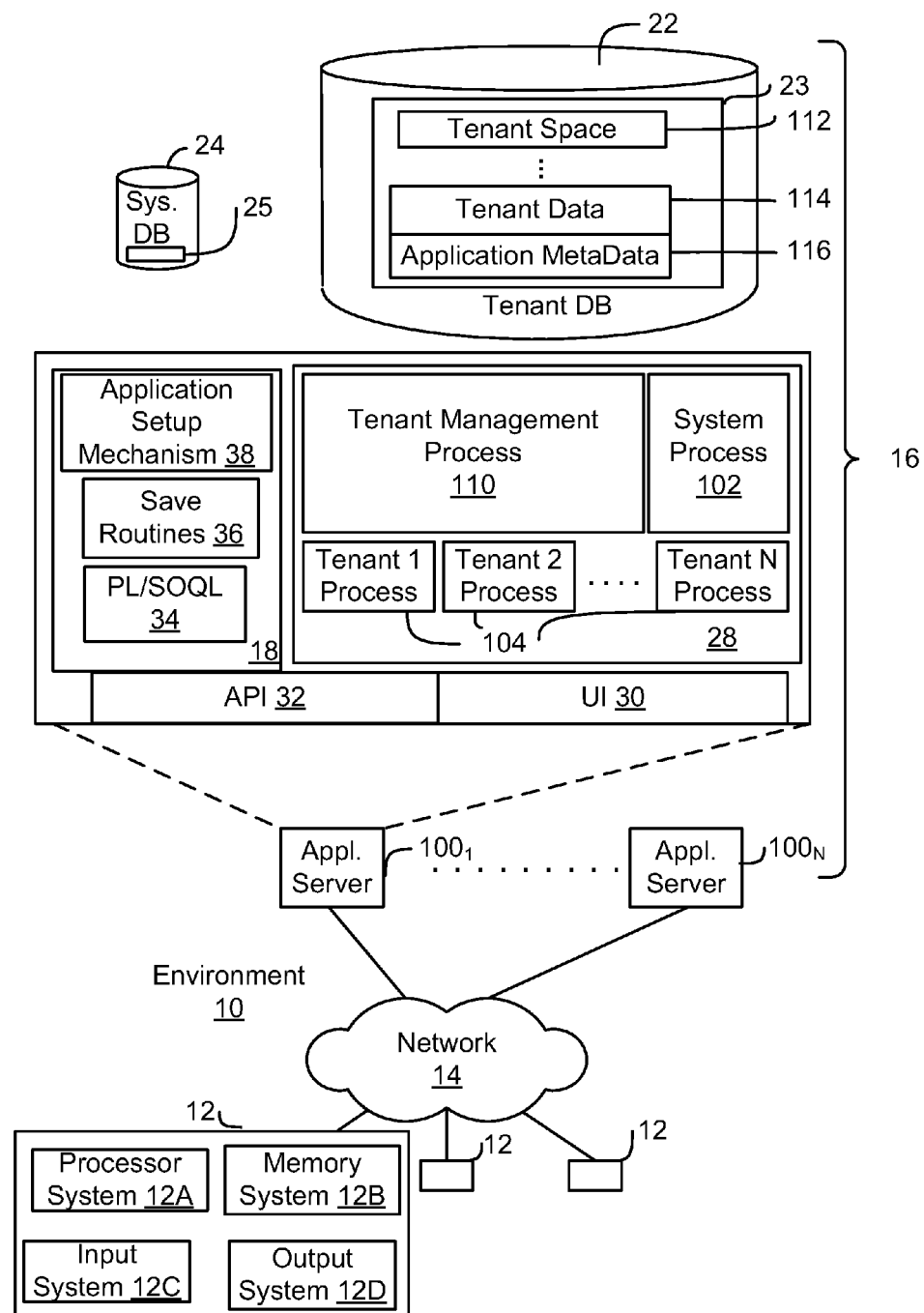
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Phishing and Threat Detection and Prevention

A threat detection system may detect and prevent phishing attacks and other security threats. A user system may receive an email. The user system may send links contained in the email to a threat detection manager. The threat detection manager may check the link with whitelists of known secure websites and blacklists of known phishing websites. The threat detection manager may send a trust indication to the user system when the link is identified in the whitelist. The user system then may display a trusted message when the user moves a cursor over the link.

If not on the whitelist, the threat detection manager may check the link with the blacklist of known phishing websites. If the link is identified in the blacklist, the threat detection manager sends a block indication to the user system. The user system may replace the link in the email with a warning message identifying the blacklisted link. The warning message may include the option for overriding the warning and selecting the link. The override feature allows the user to respond to legitimate emails but reduces the likelihood of the user inadvertently selecting blacklisted links.

The threat detection manager also may send an ok indication when the link is not located in either the whitelist or blacklist. The user system then may display an ok message when the user moves the cursor over the link.

Users of a particular enterprise may report suspicious emails and/or links to the threat detection manager. The security administrator may add links to confirmed safe websites to the whitelist. A security administrator for the enterprise also may add links for confirmed phishing websites to the blacklist Thus, the threat detection system may use crowd sourcing for detecting enterprise centric phishing attacks.

The threat detection system may identify threats at the time the user opens the email. This enables the threat detection system to identify and remove links after phishing emails arrive in user mailboxes but prior to displaying the email to the user. This enables the threat detection system to provide asynchronous, up-to-the-minute, real-time protection for recently detected phishing attacks.

Threats may be referred to below as phishing attacks but include any virus, malware, or any electronic communication that tries to acquire sensitive information such as usernames, passwords, and credit card details by masquerading as a trustworthy entity in an electronic communication, that attempts to damage or disable a computer system, and/or that threatens the security of a user, enterprise, and/or computer system.

The description below also refers generally to links. A link may include a hostname, IP address, email address, or any other name or address. In one example, links may include universal resource locators (URLs) but also may include any other addressing or communication scheme or protocol for connecting, communicating, and/or accessing different network devices, locations, and/or content.

Figure 2:
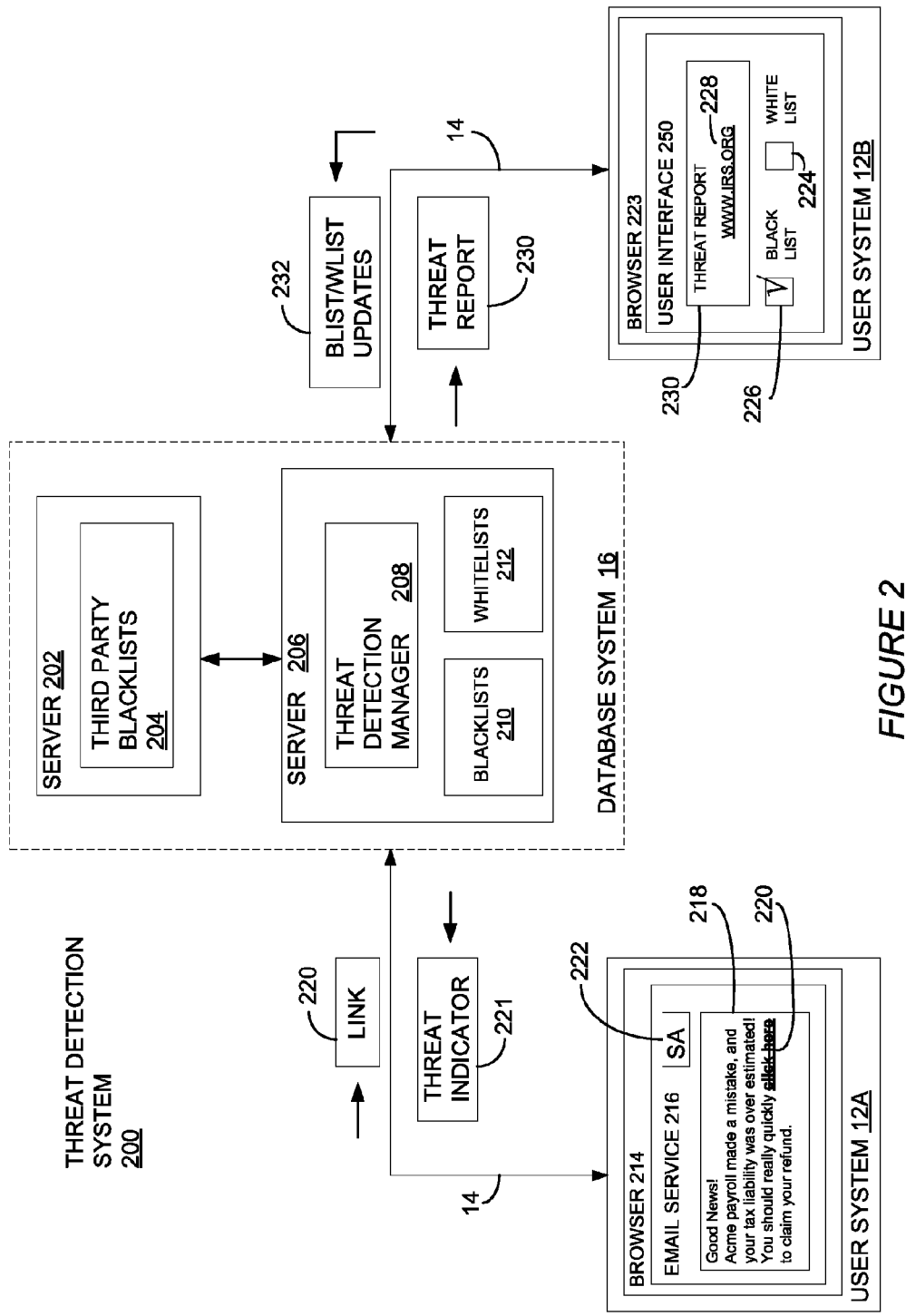
FIG. 2 shows a block diagram of a threat detection system accordingly to some implementations.

FIG. 2 shows a threat detection system 200 according to some implementations. A database system 16 as described above may include a server 206 that operates a threat detection manager 208 and stores one or more blacklists 210 and whitelists 212. Blacklists 210 may contain links associated with phishing threats. For example, one of the links in blacklist 210 may connect to a website that appears associated with the Internal Revenue Service (IRS) but is actually a website that fraudulently attempts to obtain social security numbers. Whitelist 212 contains links to known safe websites that are not associated with phishing threats. For example, whitelist 212 may include hostnames and/or IP addresses for servers within a known legitimate enterprise domain.

A server 202 may contain third party blacklists of links associated with phishing attacks. For example, companies such as Google®, Norton®, Mcafee®, Trendmicro®, etc. may operate servers that identify links associated with viruses, malware, phishing, and any other types of security threat.

User system 12A as described above may operate a web browser 214 that accesses an online email service 216. For example, a Google® Chrome® web browser or a Mozilla® Firefox® web browser may access a Gmail or Thunderbird email service 216. Of course user system 12A may operate any type of browser 214 that accesses any type of email service 216. For example, email service 216 may operate on a private enterprise server, such as Microsoft® Outlook®.

A second user system 12B may connect to server 206 via a web browser 223 and access a user interface 250 operated by threat detection manager 208. User systems 12A and 12B communicate with server 206 via network 14 as described above.

An extension operating within browser 214 may operate as a security agent 222. A user may select or open an electronic mail message (email) 218 within email service 216. Security agent 222 may send a link 220 within email 218 to threat detection manager 208 in response to a user selecting or opening email 218.

Threat detection manager 208 may compare link 220 with entries in whitelists 212 and blacklists 210 and send a trust level indicator 221 back to security agent 222 based on the results of the comparison. For example, threat detection manager 208 may send a trust indicator 221 back to security agent 222 when link 220 is identified in whitelists 212. In response to trust indicator 221, security agent 222 may display a message next to link 220 indicating the link is trusted.

Threat detection manager 208 may identify link 220 in blacklist 210 and send an associated block indicator 221 back to security agent 222. In response to block indicator 221, security agent 222 may remove link 220 from email 218.

Threat detection manager 208 may send an ok indicator 221 back to security agent 222 when link 220 is not identified in whitelists 212 or blacklists 210. In response to ok indicator 221, security agent 222 may display a message next to link 220 indicating the link is ok and not listed in either blacklists 210 or whitelists 212. Threat detection manager 208 also may send messages with threat indicators 221 that indicate how link 220 was resolved with whitelists 212 and blacklists 210 and the associated reason link 220 was assigned a particular threat indicator 221.

In the example of FIG. 2, threat detection manager 208 identifies link 220 in blacklist 210 and sends a block indicator 221 to security agent 222. In response to block indicator 221, security agent 222 modifies the document object model (DOM) for email 218 by replacing link 220 with an image showing the name associated with link 220 crossed out. Thus, the user opening email 218 is prevented from connecting to the host website or web page associated with link 220.

Threat detection system 200 allows users to report suspicious emails or suspicious links to threat detection manager 208. For example, security agent 222 may display a window (see FIG. 3) for reporting email 218 and/or link 220. Security agent 222 sends the identified email 218 and/or link 220 to threat detection manager 208. A security administrator operating user system 12B may open user interface 250 to access threat detection manager 208 and display a threat report 230. Threat report 230 may identify the hostname or IP address 228 for the link 220 and/or the sender email address for email 218.

The security administrator may determine a threat level for the hostname and/or IP address 228 in threat report 230. For example the security administrator may identify intermediate and final destinations associated with hostname and/or IP address 228. The security administrator then may perform a manual search or use known phishing, malware, or virus attack software to identify threat status for the intermediate and final hostnames and IP addresses 228.

Based on the analysis, the security administrator may select an icon 226 for assigning hostname or IP address 228 to blacklists 210 or select an icon 224 for assigning hostname or IP address 228 to whitelists 212. User interface 250 then sends an update message 232 to threat detection manager 208 assigning hostname or IP address 228 to blacklists 210 or whitelists 212. Otherwise, hostname or IP address 228 remains unaffiliated with blacklists 210 and whitelists 212.

Threat detection manager 208 may use crowd sourcing to create enterprise centric blacklists 210 and whitelists 212. For example, a company may load security agent 222 on the web browsers 214 of all company employees. All security agents 222 may send threat reports 230 to the same threat detection manager 208. The security administrator monitoring user interface 250 is immediately notified of any suspicious emails and associated links directed to any company employee. The security administrator may immediately add links confirmed as phish attacks to the company specific blacklist 210 or immediately add confirmed non-threats to a company specific whitelist 212. Thus, threat detection system 200 may identify and block enterprise related threats more accurately and more quickly than global malware related blacklists.

As mentioned above, threat detection manager 208 also may correlate enterprise related blacklists 210 with third party blacklists 204. For example, threat detection manager 208 may add third party blacklist 204 to enterprise specific blacklists 210. Threat detection system 200 may asynchronously update blacklists 210 via dashboard 250 independently of any updates in third party blacklist 204.

Figure 3:
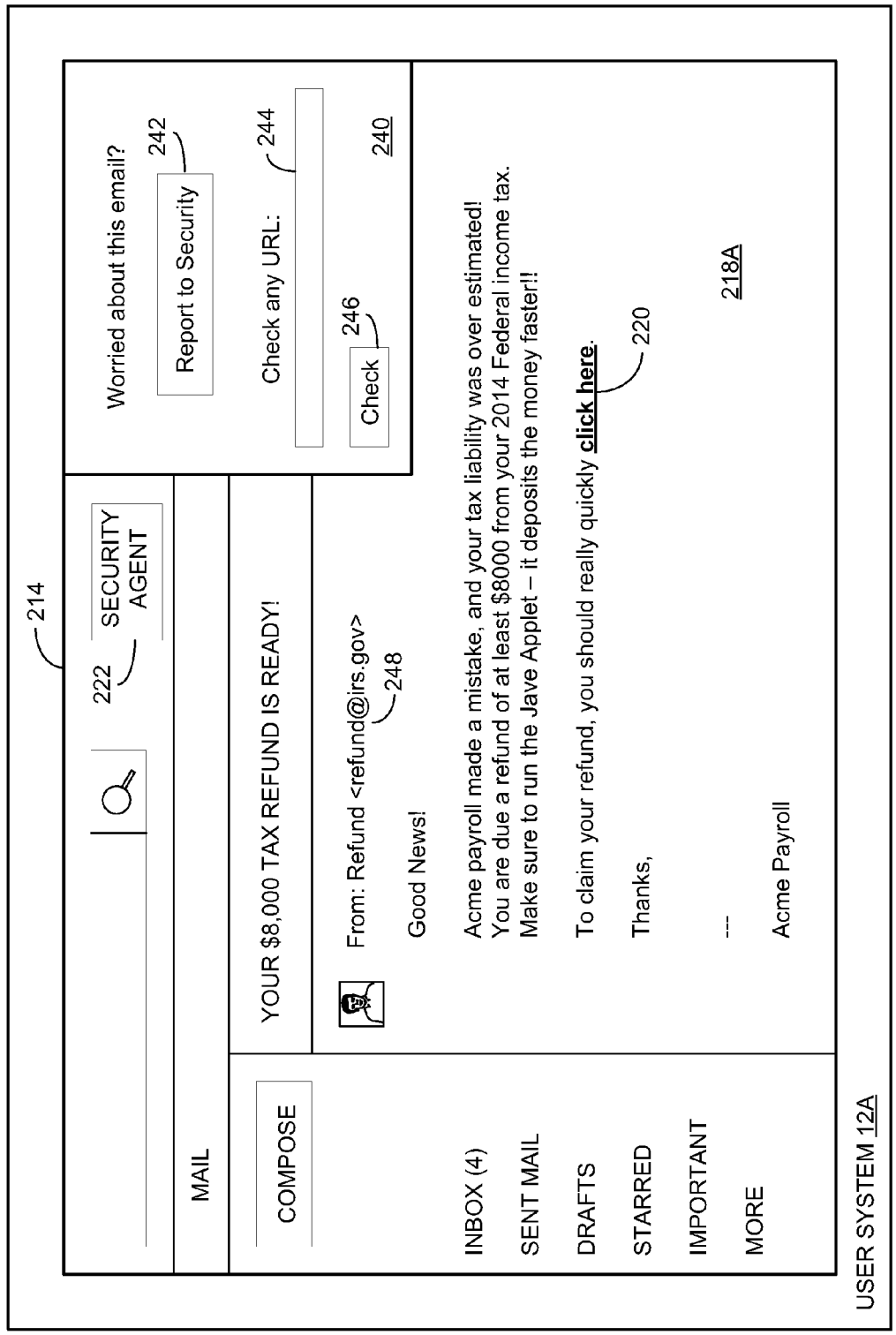
FIG. 3 shows an example user interface for reporting a suspected phishing attack accordingly to some implementations.

FIG. 3 shows an example user interface for reporting a suspect phishing attack accordingly to some implementations. Referring to FIGS. 2 and 3, browser 214 accesses an on-line email service and opens email 218A. In this example email 218A includes link 220 to a website for allegedly claiming an income tax refund. In this example the source email address 248 and the URL for link 220 of email 218A are not currently in blacklists 210 of threat detection manager 208.

A user may question the legitimacy of email 218A. As described above, browser 214 includes an extension that operates as security agent 222. Security agent 222 displays window 240 in response to selecting an icon (not shown) displayed in browser 214. In another example, security agent 222 may display window 240 in response to the user right clicking a mouse button, hovering a cursor over email address 248, or hovering the cursor over link 220. Of course other schemes could also be used for displaying window 240.

Window 240 queries the user to report a suspect email by selecting icon 242 and/or report a suspect URL by entering the link into a field 244. In response to selecting icon 242, security agent 222 sends email 218A, email address, and/or any links within email 218A to threat detection manager 208. A user may right click on any link, such as link 220, to enter the associated URL into field 244. Security agent 222 sends the URL to threat detection manager 208 in response to selecting icon 246.

Figure 4:
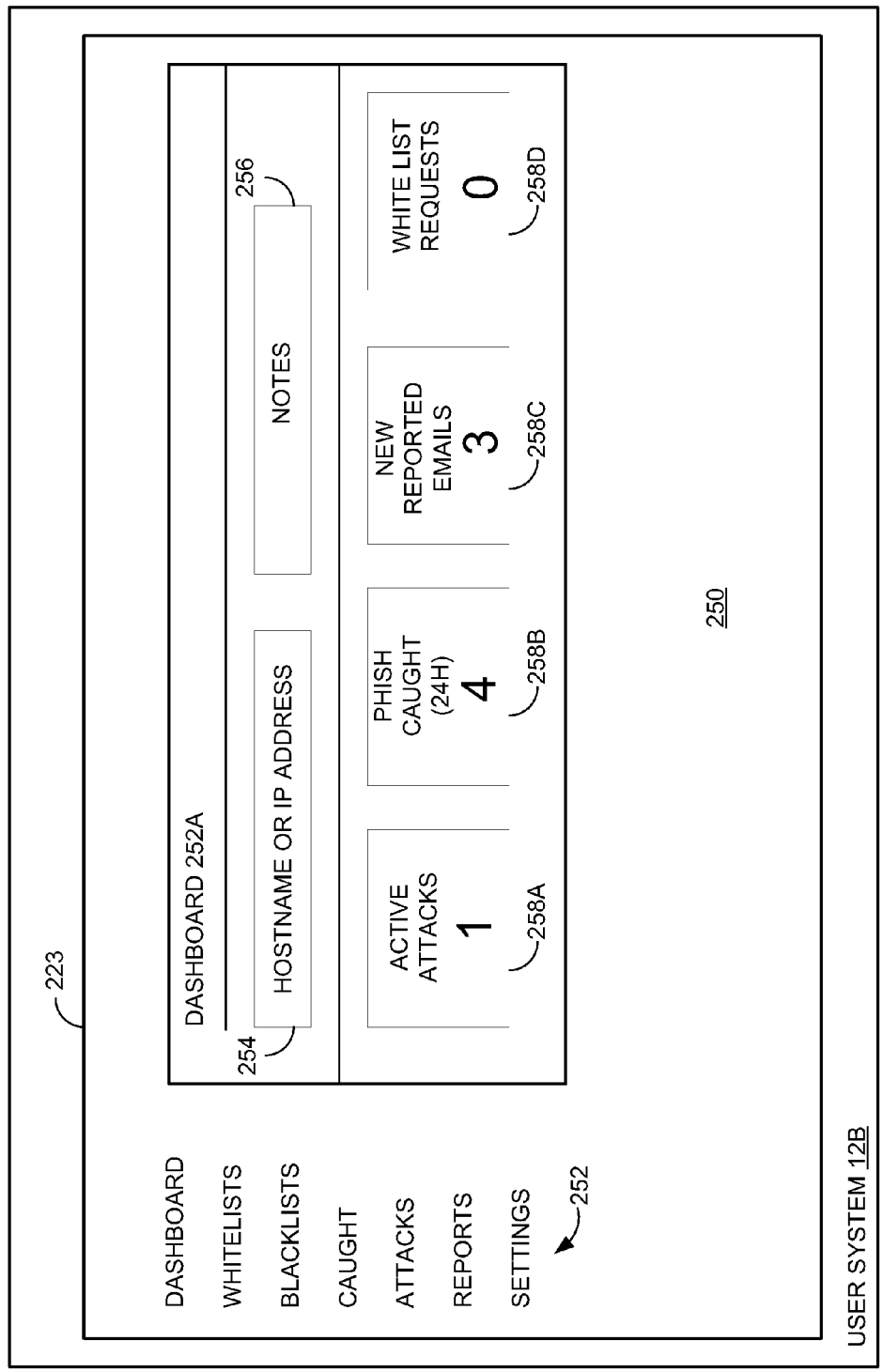
FIG. 4 shows an example user interface for tracking phishing attacks accordingly to some implementations.

FIG. 4 shows an example user interface for tracking phishing attacks accordingly to some implementations. Referring to FIGS. 2 and 4, web browser 223 accesses threat detection manager 208 via user interface 250. User interface 250 displays a list of different security management pages 252, such as dashboard, blacklists, whitelists, caught, attacks, reports, and settings pages. User interface 250 is currently showing one example of dashboard page 252A.

Dashboard page 252A may include a field 254 for entering a hostname or IP address that may already exist in the threat detection system or that the security administrator would like to add to the threat detection system. For example, the administrator may enter or identify a hostname or IP address currently in a blacklist or in a whitelist via field 254. A field 256 may display any notes assigned to the hostname or IP address entered into field 254.

Boxes 258 identify different phishing statistics. Box 258A may identify the number of active phishing attacks. For example, the threat detection system may count the number of times a blacklisted link from a same host or IP address is received by users in the enterprise network. The threat detection manager may identify an active attack for any link identified as blacklisted and blocked over some configurable threshold number of times within a configurable time period. For example, a link may be identified as an active attack if identified and blocked more than 25 times within 30 minutes. Of course, this is just one example set of thresholds that may be configured for identifying active attacks in block 258A.

Box 258B may identify the total number of links caught and blocked over a particular time period. For example, threat detection manager 208 may identify in box 258B the total number of all blacklists links removed from emails over the last 24 hours. In another example, the security administrator may enter a specific blacklisted link into field 254 and threat detect manager 208 may indicate in block 258B the number of times that specific link was detected and removed from emails.

Box 258C may identify the total number of suspected emails reported by users. For example, threat detection manager 208 may increment the number in box 258C each time a user reports a suspected phishing email. In another example, the security administrator may enter a specific hostname, IP address, or email address into field 254 and threat detection manager 208 may count the number of reports that included the hostname, IP address, or email address in field 254.

Box 258D may identify the number of whitelist requests. In another example, threat detection manager 208 may increment the number in box 258D whenever a user sends a whitelist request identifying the link entered into field 254.

Figure 5:
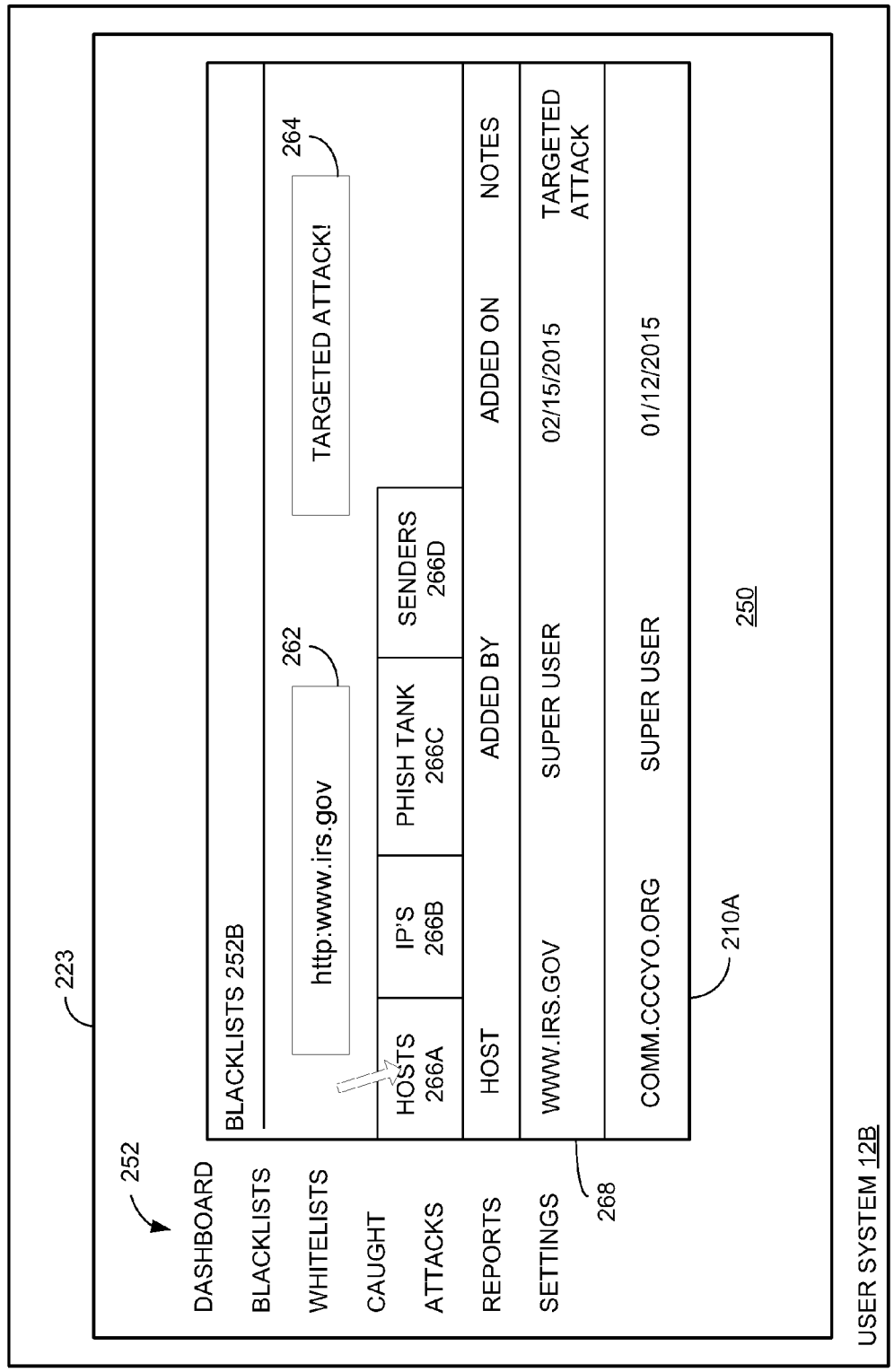
FIG. 5 shows an example user interface for adding links to a blacklist accordingly to some implementations.

FIG. 5 shows an example user interface for adding links to a blacklist. Web browser 223 may display blacklist page 252B in response to selecting the blacklists from page list 252. In this example, the security administrator determines that a reported hostname www.irs.gov is associated with a phishing, virus, malware, or other attack. For example, the security administrator may access or search the www.irs.gov website and determine the website is not affiliated with the Internal Revenue Service.

Blacklist page 252B may include different tabs 266 for different blacklists. For example, a first tab 266A may be associated with a hostname blacklist, a second tab 266B may be associated with an IP address blacklist, a third tab 266C may be associated with a phish tank blacklist, and a fourth tab 266D may be associated with an email sender blacklist. The security administrator selects tab 266A to view and/or enter hostnames into a hostname blacklist 210A.

The security administrator enters the hostname www.irs.gov into field 262 and may enter comments into field 264. Host name www.irs.gov is then added as entry 268 of hostname blacklist 210A. Selecting tab 266B displays another page for displaying and/or entering blacklisted IP addresses. Tab 266C is selected for displaying a list of all phishing links in all of the blacklists Selecting tab 266D displays a page for displaying and/or entering blacklisted email sender addresses.

Selecting whitelists from page list 252 displays a page similar to blacklist page 252B but that displays and enters hostnames, IP address, and sender email addresses into different whitelists. Selecting caught from page list 252 displays a report identifying the blacklisted links that have been blocked. Selecting attacks from page list 252 displays the host names or addresses for the different phishing attacks and may display a list of the top 10 phishing attacks sent to the most users.

Figure 6:
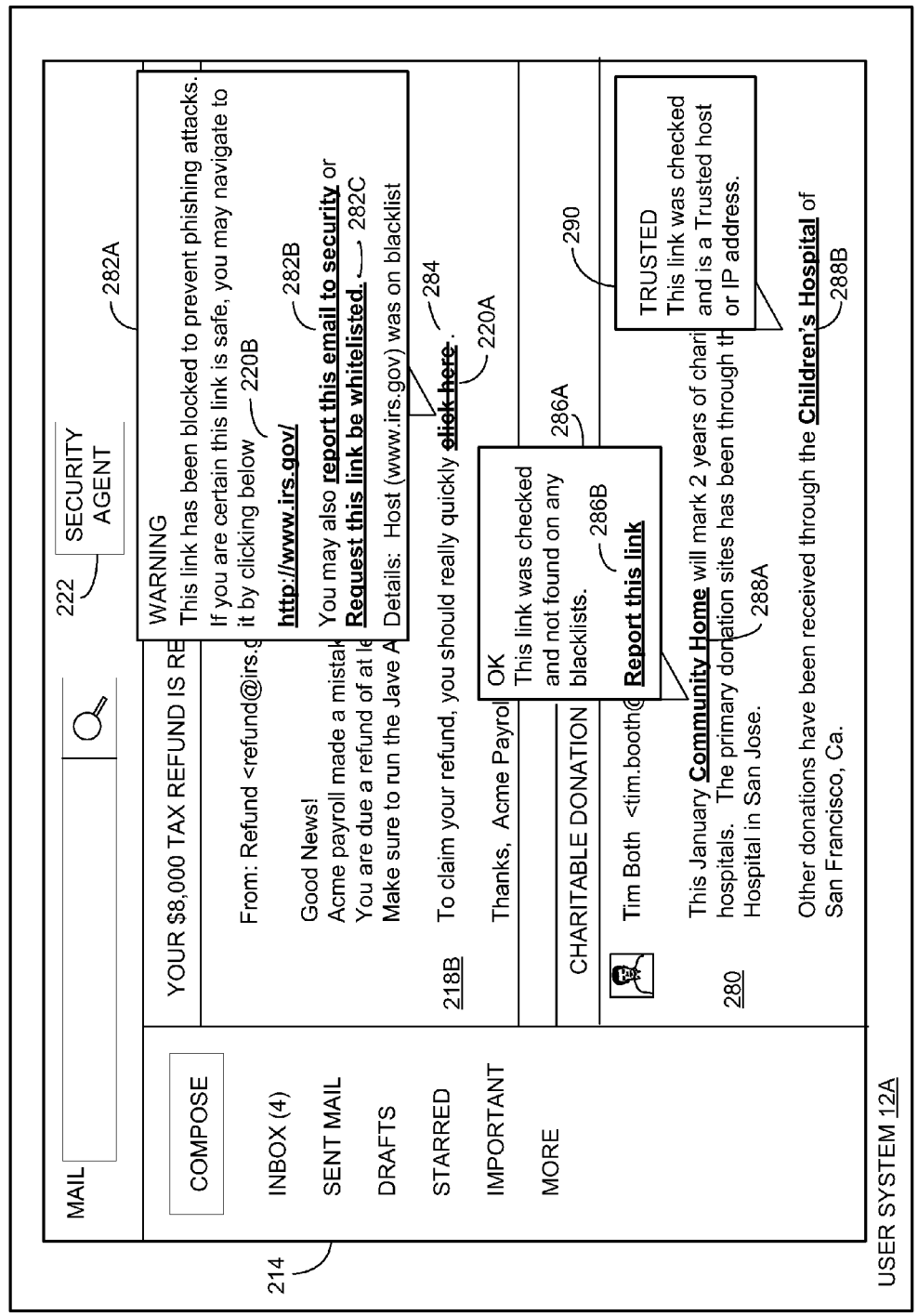
FIG. 6 shows an example web browser displaying different threat level messages according to some implementations.

FIG. 6 shows an example web browser displaying different threat messages according to some implementations. Email 218A in FIG. 3 represents email 218 prior to link 220 being reported to the threat detection manager and blacklisted by the security administrator. Email 218B in FIG. 6 represents email 218 after link 220 is blacklisted. Email 218B may be reopened by the same user that originally reported link 220 to the threat detection system or may be received and opened by other users.

Referring to FIGS. 2 and 6, in response to selecting or opening email 218B in web browser 214, security agent 222 sends link 220A to threat detection manager 208. Threat detection manger 208 identifies link 220A in blacklist 210 and sends a block indicator back to security agent 222. Based on the block indicator, security agent 222 modifies the DOM of email 218B by replacing link 220A with an image 284 showing the name associated with link 220A crossed out.

Threat detection manager 208 may send an additional warning message 282A with the block indicator. In another example, security agent 222 may store a set of messages that are associated with different security threat levels and display one of the messages based on the type of threat indicator received back form threat detection manager 208.

Security agent 222 displays warning message 282A in a popup window when email 218A is opened or in response to the user moving a cursor over image 284. Warning message 282A may include text indicating why link 220A was blocked. For example, warning message 282A may indicate that link 220A was identified in a blacklist Security agent 222 may display warning message 282A with a first red background to indicate a highest threat level.

Warning message 282A also may include link 220B (same hostname or IP address as link 220A) and allow the user to ignore the warning. Relocating link 220B in warning message 282A provides a notice from inside of a separate warning notification. The user may be less likely to unintentionally select a link located within warning message 282A. Providing link 220B in warning message 282A enables the user to carefully override a link removal that was mistakenly blacklisted.

Warning message 282A also may include a link 282B for the user to report email 218B to threat detection manager

208. Link 220A may have been mistakenly blacklisted. The user may select a link 282C to connect to threat detection manager 208 and request reassignment of link 220A to a whitelist.

The user may open another email 280 in web browser 214. Security agent 222 sends links 288A and 288B from email 280 to threat detection manager 208. In this example, threat detection manager 208 identifies link 288B in a whitelist and does not locate link 288A in any blacklist or whitelist.

Threat detection manager 208 sends a first threat indicator back to security agent 222 identifying link 288A as ok and sends a second threat indicator back to security agent 222 identifying link 288B as trusted. Security agent 222 modifies the DOM for email 280 by attaching a message 286A to link 288A indicating link 288A was not found in any blacklists Security agent 222 may display message 286A with a second background color, such as blue. Message 286A also may include a link 286B for reporting link 288A to threat detection manager 208.

Security agent 222 may attach a message 290 to link 288B identifying link 288B as trusted. Security agent 222 may display message 286A with a third background color, such as green. Web browser 214 may display message 286A or 290 in response to a cursor moving over links 288A or 288B, respectively.

In one example, threat detection manager 208 may automatically add items to blacklists 210. For example, threat detection manager 208 may automatically add a link to the blacklist after a threshold number of users, such as 10 users, report a same link as a possible threat. After the 10 reported threats, threat detection manager 208 may automatically start removing the link from user email messages.

Threat detection manager 208 also may automatically generate a sub-warning threat indicator that does not block the suspected link. For example, threat detection manager 208 may generate a sub-warning threat indicator for links reported by a second lower threshold number of users, such as 5 users. The sub-warning threat indicator causes security agent 222 to display a sub-warning message with the link identifying the number of users reporting the link as a potential threat. Security agent 222 may display the sub-warning message in a fourth background color different from the background colors used in warning message 282A, ok message 286A, and trusted message 290.

Figure 7:
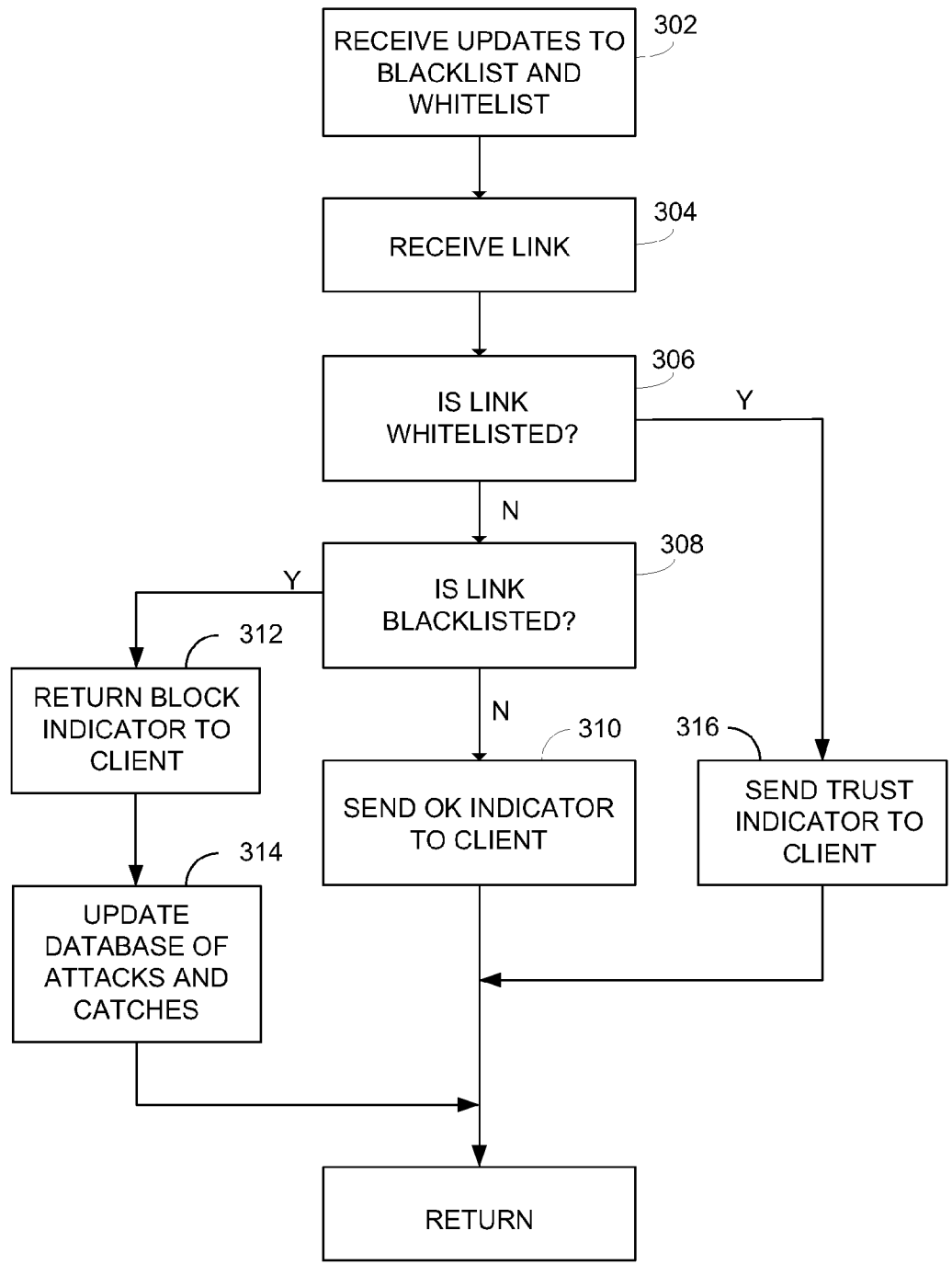
FIG. 7 shows an example process for assigning threat level indicators to links according to some implementations.

FIG. 7 shows an example process for assigning threat level indicators to links according to some implementations. Referring to FIGS. 2 and 7, threat detection manager 208 in operation 302 receives updates to blacklists and whitelists. As described above, a security administrator may send asynchronous updates to blacklists 210 and/or whitelists 212 based on user threat reports. Threat detection manager 208 also may download and add third party blacklists 204 to local blacklists 210. In the other example described above, threat detection manager 208 automatically updates the blacklists and/or whitelists based on user reports.

In operation 304, the threat detection manager receives a link from a user. For example, a security agent 222 on a web browser may send a link from an email selected or opened by the user. In operation 306, threat detection manager 208 compares the hostname, IP address, email address, URL, or any other identifier associated with the link with the whitelists.

The threat detection manager in operation 316 sends a trust indicator back to the security agent if the link is whitelisted. The threat detection manager may assign a trusted indicator to links with whitelisted intermediate and final hosts or that have a whitelisted final host with no intermediate hosts.

If the link is not whitelisted, the threat detection manager in operation 308 compares the received link with any blacklists After checking the blacklist of explicit phishing links, the threat detection manager may check external third party phishing warning databases.

If the link is blacklisted in either the explicit blacklist or the external third party blacklist, the threat detection manager in operation 312 sends a block indicator back to the security agent on the web browser. In operation 314, the threat detection manager may update a database that tracks the number of phishing attacks and catches by adding an additional phishing catch and incrementing the total number of times the link has been caught over some specified time period.

As mentioned above, the threat detection system may blacklist any link with a non-secure final and/or intermediate link. For example, some links may address a non-blacklisted redirection site, such as Bit.ly®. However, the non-blacklisted redirection website may forward the link to a final phishing website. In another example, the intermediate website may be a phishing site and the final destination may be a secure website. The threat detection system may blacklist any link associated with an intermediate or final phishing host or IP address.

Threat detection manager 208 also may resolve a hostname for a URL to an IP address and check the IP address against blacklisted IP addresses. For example, a link may comprise the URL http://evil.com and may resolve to the IP address 123.123.123.123. Threat detection manager 208 may have previously determined IP address 123.123.123.123 points to a known phishing server and added the IP address to a blacklist.

The evil.com domain may be a new domain not seen before by threat detection manager 208. Threat detection manager 208 may evaluate http://evil.com and determine http://evil.com resolves to 123.123.123.123. Even though the URL is not currently blacklisted, the IP address associated with the URL is blacklisted. Accordingly, threat detection manager 208 may block the http://evil.com link and add the link to a blacklist.

In operation 310, the detection manager does not locate the link in any whitelist or blacklist and sends an ok indicator back to the security agent. After operations 314, 310, and 316, the threat detection manager returns to operation 300 and continues monitoring for any new updates to the blacklists and whitelists.

The security administrator may add known secure IP address ranges to the whitelists. For example, the security administrator may add a set of IP addresses associated with an enterprise to the whitelists. The security administrator also may blacklist specific URL locations but whitelist the URL host. For example, the security administrator may whitelist a link to known public hosting site but blacklist a URL to a specific directory, web page, or document located on the public hosting site.

Figure 8:
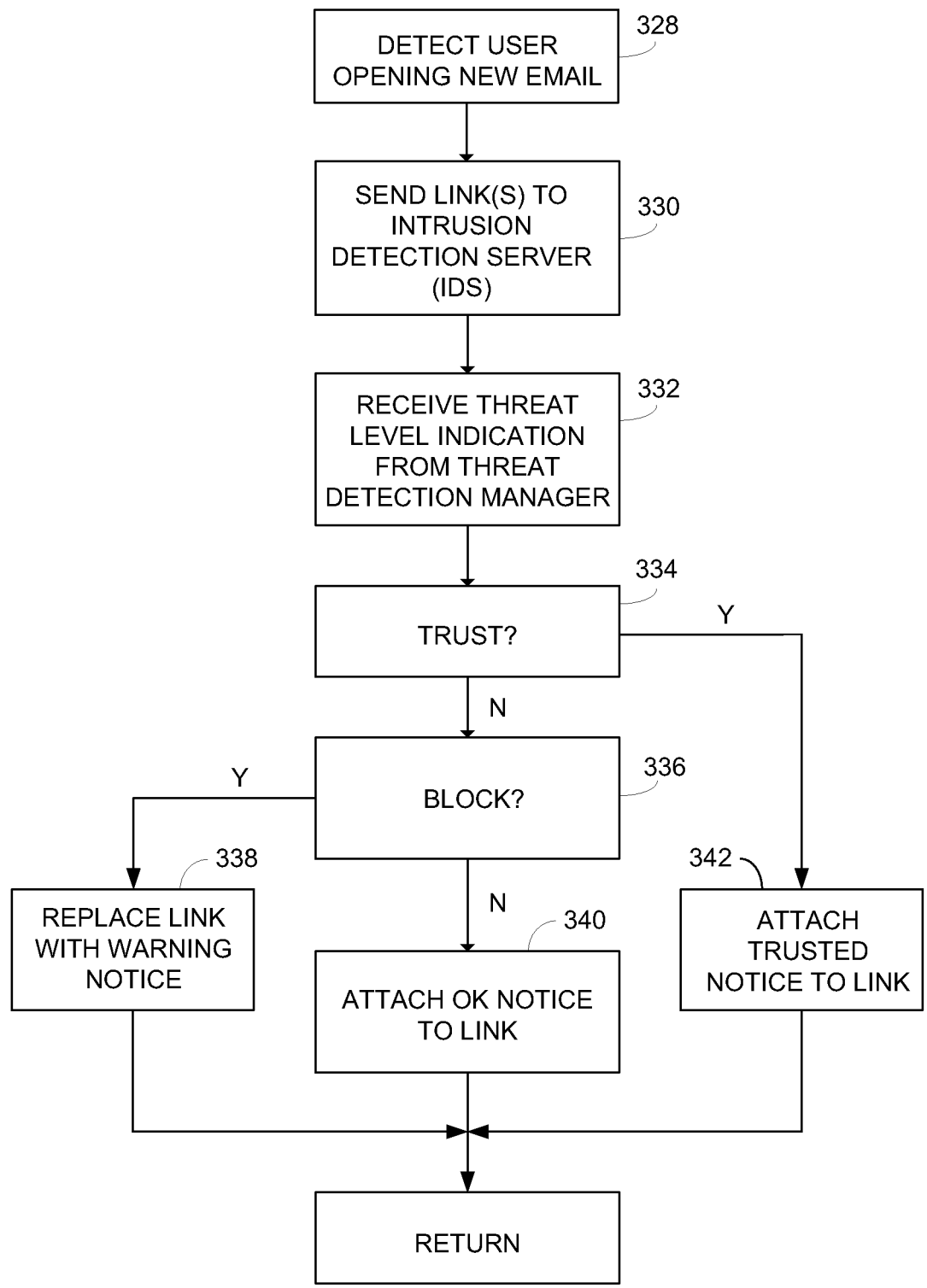
FIG. 8 shows an example process for displaying threat messages according to some implementations.

FIG. 8 shows an example process for displaying threat messages according to some implementations. In operation 328, the security agent operating in the web browser detects a user selecting and/or opening a new email message. In operation 330, the security agent sends links contained in the email to the threat detection manager.

The threat detection system does not need to identify and remove phishing threats at the time the emails arrive at the enterprise network. Sending links in response to users opening email messages allow the threat detection system to identify phishing attacks even after emails arrive in user inboxes based on asynchronous up-to-the-minute blacklist updates. However, in another example, the security agent may detect new emails received in a user inbox and send the associated links to the threat detection manager prior to the user opening the emails.

In operation 332, the security agent receives threat level indicators back from the threat detection manager. For example, the threat detection manager may send block indications for links identified in a blacklist, send trust indications for links identified in a whitelist, and send ok indications for links not identified in any blacklist or whitelist.

In operation 334, the security agent receives a trusted indication for the link. In operation 342, the security agent attaches a trusted message to the link that the web browser displays when the user moves a cursor over the link. The trusted message notifies the user that the link was identified in a whitelist.

In operation 336, the security agent receives a block indication for a link. In operation 338, the security agent replaces the link with a warning notice. For example, the security agent may modify hypertext markup language (HTML) code in the web page DOM that removes the link and displays a warning message. The security agent also may replace the link with an image of the link name crossed-out The warning notice notifies the user that the link was identified in a blacklist. As explained above, the warning notice also may include the link and allow the user to override the warning and connect to the linked host computer.

In operation 340, the security agent receives an ok identifier for the link. The security agent attaches an ok message to the link that the web browser displays when the user moves a cursor over the link. The ok message notifies the user that the link was not identified in any whitelist or blacklist.

Threat detection system 200 may provide substantially real-time automatic monitoring and editing for phishing attacks. Users no longer need to view security posts and remember names of dangerous links. Further, the user may report suspicious links with a single mouse click as shown in FIG. 3. The threat detection system may operate within a specific enterprise where a security administrator may quickly create and update company centric blacklists and whitelists in response to user initiated phishing reports.

It should also be noted that the security agent may identify documents other than emails. For example, the security agent may detect links in any web page, post, and/or other document opened on the web browser. The security agent also may search through files or any other documents attached or linked to an email or web page and block blacklisted links within the files or documents. The threat detection system also may identify and block entire emails based on the associated source IP address.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system for detecting and preventing phishing attacks, the database system comprising:
   a hardware processor; and
   one or more stored sequences of instructions which, when executed by the processor, cause the processor to carry out the steps of:
   detecting a request to open an electronic mail message (email) after the email has arrived in a user mailbox;
   prior to opening the email in the user mailbox, sending a link contained in the email to a threat detection server in response to detecting the request to open the email;
   receiving a threat level identifier from the threat detection server associated with the link after being compared with blacklisted links; and
   opening the email and displaying a message with the email and the threat level identifier associated with the link.

2. The database system of claim 1, wherein the instructions further cause the processor to carry out the steps of:
   receiving a block indication in the threat level identifier;
   removing the link from the email based on the block indication received in the threat level identifier; and displaying a warning in the message indicating the link is associated with a phishing attack.

3. The database system of claim 2, wherein the instructions further cause the processor to carry out the steps of:
inserting the link into the message; and
replacing the link from the email with an image of a crossed out name for the link.

4. The database system of claim 1, wherein the instructions further cause the processor to carry out the steps of:
receiving a trust indication in the threat level identifier; and
displaying a trusted notice in the message based on the trust indication received in the threat level identifier.

5. The database system of claim 1, wherein the instructions further cause the processor to carry out the steps of:
inserting a reporting link in the message configured to connect to the threat detection server and report the link as a possible phishing attack.

6. The database system of claim 1, wherein the instructions further cause the processor to carry out the steps of operating a security agent in a web browser, wherein the security agent is configured to:
detect the request to open the email;
identify the link in the email;
send the link to the threat detection server;
receive the threat level identifier back from the threat detection server; and
modify a document object model (DOM) for the email to display the message based on the threat level identifier.

7. The database system of claim 6, wherein the security agent is further configured to display a reporting window in the web browser for reporting suspected phishing links to the threat detection server, wherein the threat detection server is configured to add the suspected phishing links to the blacklisted links based on a verification the suspected phishing links are associated with phishing attacks.

8. A database system for detecting and preventing security threats, the database system comprising:
a hardware processor configured to:
receive reports from user systems associated with an enterprise;
identify suspected links in the reports as blacklisted links when the suspected links are associated with security threats;
receive a link associated with an object of an email residing on one or more of the user systems and selected to be opened by one or more of the user systems after the email has arrived in a user mailbox and prior to opening the email from the user mailbox;
compare the received link with the blacklisted links; and
send a threat level identifier back to the one or more user systems based on the comparison of the received link with the blacklisted links to cause the object to be opened and the threat level identifier to be displayed with the opened object.

9. The database system of claim 8, wherein the object comprises an email message or a web page.

10. The database system of claim 8, wherein the processor is further configured to send a block indication in the threat level identifier when the received link matches one of the blacklisted links, wherein the block indication causes the one or more user systems to remove the received link from the associated object.

11. The database system of claim 10, wherein the block indication causes the one or more user systems to display a warning message that includes the received link and indicates the received link was identified as one of the blacklisted links.

12. The database system of claim 8, wherein the processor is further configured to:
compare the received link to whitelisted links verified as not associated with phishing attacks prior to comparing the received link with the blacklisted links; and
send a trusted indication in the threat level identifier when the received link matches one of the whitelisted links, wherein the trusted indication causes the one or more user systems to display a trusted message in conjunction with the received link.

13. The database system of claim 12, wherein the processor is further configured to send an ok indication in the threat level identifier when the received link does not match any of the blacklisted links and does not match any of the whitelisted links, wherein the ok indication causes the user systems to display an ok message in conjunction with the received link.

14. The database system of claim 8, wherein the processor is further configured to assign the suspected links in the reports to the blacklisted links based on a number of the reports identifying the suspected links.

15. The database system of claim 14, wherein the processor is further configured to:
identify whitelisted links in the reports indicated as safe and not associated with phishing attacks;
compare the received link with the whitelisted links; and
send the threat level identifier back to the one or more user systems based on the comparison of the received link with the blacklisted links and the whitelisted links.

16. The database system of claim 8, wherein the processor is further configured to:
identify a number of times the received link is blocked in response to matching one of the blacklisted links; and
report the received link as a phishing attack when the number of times is above a given threshold.

17. A method for detecting security threats in a database system, comprising:
receiving, by a hardware processor of the database system, a link associated with an email residing in a user mailbox and selected in a web browser from the user mailbox after the email has arrived in the user mailbox and prior to opening the email from the user mailbox;
comparing, by the database system, the received link with a whitelist of trusted links;
sending, by the database system, a trusted identifier back to the web browser when the received link is identified in the whitelist, wherein the trusted identifier causes the web browser to display a level of the trusted identifier and a trusted message in conjunction with the received link in the email;
comparing, by the database system, the received link with a blacklist of links associated with the security threats; and
sending, by the database system, a block identifier back to the web browser when the received link is identified in the blacklist, wherein the block identifier causes the web browser to remove the received link from the email.

18. The method of claim 17, further comprising sending an ok identifier back to the web browser when the received link is not identified in the whitelist or blacklist, wherein the ok identifier causes the web browser to display an ok message in conjunction with the received link in the email.

19. The method of claim 17, further comprising:
receiving threat reports identifying suspected phishing links;
displaying the threat reports on a user interface; and
updating the blacklist with the suspected phishing links selected via the user interface.

20. The method of claim 19, wherein processor is further configured to:
count a number of the threat reports that include a common one of the suspected phishing links; and
assign a warning identifier to the common one of the suspected phishing links when the number of the threat reports is above a first threshold value.

21. The method of claim 20, wherein processor is further configured to add the common one of the suspected phishing links to the blacklist when the number of the threat reports is above a second threshold value greater than the first threshold value.

22. The method of claim 17, further comprising:
identifying blacklisted internet protocol (IP) addresses;
identifying a universal resource locator (URL) in the received link;
resolving the URL to an associated IP address; and
sending the block identifier and adding the URL to the blacklist when the associated IP address matches one of the blacklisted IP addresses.

* * * * *